(12) United States Patent
Swierkocki et al.

(10) Patent No.: US 11,780,186 B1
(45) Date of Patent: Oct. 10, 2023

(54) METHODS FOR FABRICATING INFLATABLE DEVICES

(71) Applicant: Air Cruisers Company, LLC, Wall Township, NJ (US)

(72) Inventors: Thomas W. Swierkocki, Manasquan, NJ (US); Christian W. Thomson, Manasquan, NJ (US); Stanley J. Pawlowski, Jr, South River, NJ (US); Sean M. Blazick, Jackson, NJ (US)

(73) Assignee: AIR CRUISERS COMPANY, LLC, Wall Township, NJ (US)

( * ) Notice: Subject to any disclaimer, the term of this patent is extended or adjusted under 35 U.S.C. 154(b) by 901 days.

(21) Appl. No.: 16/561,219

(22) Filed: Sep. 5, 2019

Related U.S. Application Data

(60) Provisional application No. 62/727,834, filed on Sep. 6, 2018.

(51) Int. Cl.
*B29D 22/02* (2006.01)
*B29C 65/14* (2006.01)
*B29C 65/02* (2006.01)

(52) U.S. Cl.
CPC .............. *B29D 22/02* (2013.01); *B29C 65/022* (2013.01); *B29C 65/14* (2013.01)

(58) Field of Classification Search
CPC ........ B29C 65/14; B29D 22/02; B29C 66/729; B29K 2313/00; B32B 27/12; B32B 5/024; B29C 2035/0822; B29C 65/1412; B29C 65/1435; B29C 65/1477; B29K 2995/0027; B32B 2307/56; B32B 2310/0825; B32B 38/0036; B29C 65/02; B29C 65/022
See application file for complete search history.

(56) References Cited

U.S. PATENT DOCUMENTS

| | | | |
|---|---|---|---|
| 3,655,488 A | 4/1972 | Goldstein et al. | |
| 3,933,549 A * | 1/1976 | Heimann et al. | E04C 2/3405 428/184 |
| 3,957,564 A | 5/1976 | Lambert et al. | |
| 6,024,525 A | 2/2000 | Yamanaka | |
| 2002/0056502 A1* | 5/2002 | Bordes | A41D 27/245 156/289 |
| 2003/0010439 A1 | 1/2003 | Fenton | |
| 2013/0277348 A1 | 10/2013 | Woods et al. | |
| 2016/0158999 A1* | 6/2016 | Cloud et al. | B29C 66/1122 156/60 |

FOREIGN PATENT DOCUMENTS

| | | |
|---|---|---|
| DE | 1931406 | 2/1970 |
| EP | 2404741 | 1/2012 |

* cited by examiner

*Primary Examiner* — Philip C Tucker
*Assistant Examiner* — Jimmy R Smith Jr.
(74) *Attorney, Agent, or Firm* — Kilpatrick Townsend & Stockton LLP

(57) ABSTRACT

Methods for fabricating inflatable devices made from air- or gas-holding fabrics. Specific embodiments relate to seam tapes, films, structural components or accessories welded to one or more fabric panels. Specifically disclosed is a fabrication system and method that reduces potential damage due to overheating seam areas. This disclosure has been found particularly useful with improved lightweight fabrics that would otherwise be susceptible to damage during welding processes.

11 Claims, 6 Drawing Sheets

METHODS FOR FABRICATING INFLATABLE DEVICES

CROSS REFERENCE TO RELATED APPLICATIONS

This application is related to and claims priority benefits from U.S. Provisional Application Serial No. 62/727,834, filed on Sep. 6, 2018, entitled "Methods to Install Tapes, Films, Structural Components, and Accessories," the entire contents of which are hereby incorporated by this reference.

FIELD OF THE INVENTION

The field of this disclosure relates to methods for fabricating inflatable devices made from air- or gas-holding fabrics. Specific embodiments relate to seam tapes, films, structural components or accessories welded to one or more fabric panels. Specifically disclosed is a fabrication system and method that reduces potential damage due to overheating seam areas. This disclosure has been found particularly useful with improved lightweight fabrics that would otherwise be susceptible to damage during welding processes.

BACKGROUND

Federal aviation safety regulations require aircraft to provide evacuation and other safety provisions for passengers. These include evacuation slides, evacuation slide/rafts, life rafts, life vests, and other life-saving inflatable devices. Relevant inflatable products that can be improved using the present disclosure can include evacuation slides, evacuation slide/rafts, aviation life rafts, marine life rafts, emergency floats, emergency flotation systems, life preservers/vests, emergency flotation devices, inflatable shelters (military and nonmilitary), ship decoys and inflatable military targets, and any other flotation devices, rescue equipment, or other safety devices requiring rapid inflation and secure air- or gas-holding functions. These inflatable devices are generally built from an assembly of inflatable tubular structures that form airbeams that are sealed to one another. Inflatable products of the type described may also have non air- or gas-holding features, such as patches, floors, sliding surfaces, girts, handles, and other features or components attached thereto.

Inflatable products are typically made of many pieces of fabric (referred to as fabric panels) joined together to form tubular structures. Safety regulations set strength requirements for the fabric panels (the field of the inflatable tube), as well as strength requirements for seam areas. In order to keep the inflation gas inside the tubes for long durations, the seams must be sealed together (via welding or use of adhesive bonding methods) to make them air- or gas- holding. Seam tapes or films may be used for this securement.

SUMMARY

During a welding operation, energy is typically equally applied to a fabric panel and a component to be welded to the fabric panel (the term "component" is used herein to refer to a seam tape, a seam film, a structural component, an accessory, or any combination thereof). This application of energy causes mating surfaces of the fabric panel and the component to melt before the materials are joined. Melting of the materials causes them to flow into one another and bond in order to create a secure seam. Subsequent pressure is applied to the seam intersection, securing the panel and the component into a welded configuration.

Possible welding methods that may be used in accordance with this disclosure include but are not limited to: thermal welding, heat or hot air welding, heated wedge welding, heated roller (or rotary wheel) welding, hot stamped welding, radiofrequency (RF) welding, ultrasonic welding, combinations thereof, or any other appropriate welding method. All of these options are generally referred to herein as "welding." The term "welding" is used herein to refer to any methods or steps that cause two separate materials to flow into one another.

The present disclosure seeks to pre-heat a component prior to its being welded to the fabric panel(s). This can allow less heat to be applied to the fabric panel during the welding process. Applying more energy to the component than is applied to the fabric panel(s) during the welding operation can help prevent damage to the air- or gas-holding properties of the fabric panel(s).

Accordingly, there is provided a method for welding a component to a fabric panel, comprising directing the component past or through an energy application device prior to contact with the fabric panel in order to raise the temperature of the component but not raise the temperature of the fabric panel; subsequently contacting the component with the fabric panel. The component can be seam tape or seam film. The component can be a structural feature or an accessory.

The energy application device may be a nozzle located before a joining intersection, a heated enclosure located before a joining intersection, an energy application device located before a joining intersection, a heated roller or a heated wedge located before a joining intersection, or any combination thereof. In some examples, the energy application device delivers applied energy at a temperature of about 200-350° C. It is possible to direct the component past an energy application device that comprises blowing hot air on the component, passing the component through an enclosure filled with hot air, passing the component past an infrared heater, moving the component over a heated wedge or a heated roller, applying radio waves (radio frequency welding), applying high-frequency ultrasonic acoustic vibrations (ultrasonic welding), microwaves, friction energy, or any combination thereof. Any of these methods may be used to manufacture an inflatable device.

Embodiments also relate to an energy application device for directing applied energy to a component to be applied to a fabric panel in manufacturing an inflatable device, the preheating device comprising: a heated enclosure comprising an inlet for receiving the component and an outlet through which the component exits, wherein the heated enclosure delivers applied energy to the component at a temperature higher than a welding temperature; a heated roller, a heated wedge, an alternate energy applying device, a primary nozzle, a secondary nozzle, or any combination thereof. The heated enclosure may deliver applied energy at a temperature of about 200-350° C.

DETAILED DESCRIPTION

Figure 2:
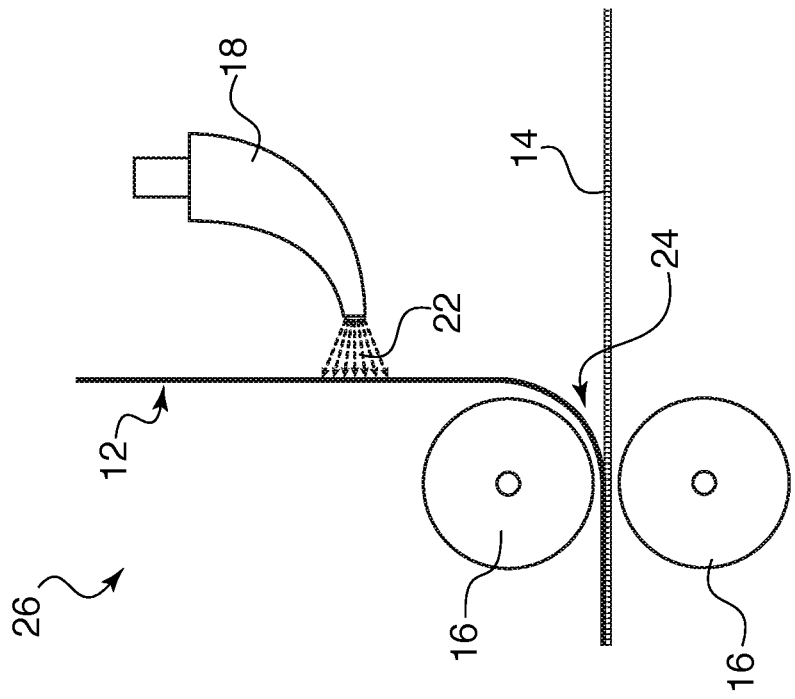
FIG. 2 shows a side plan view of a welding system that uses a raised nozzle.

During fabrication of inflatable devices such as evacuation slides, life rafts, evacuation slide/rafts, life preservers, or any other air- or gas-holding device, one or more fabric panels are secured together in an air tight manner. These seams may be secured via seam tapes and/or seam films. Additionally, accessories or other components may also be secured to the fabric panel(s). Typically, fabrics are heat welded to one another. Direct heat welding has been an acceptable and reliable securement method for heavy gauge materials.

However, the use of lighter weight fabrics has become desirable and more achievable. As background, in many instances, the described inflatable devices are mounted on board aircraft, where weight considerations directly affect fuel consumption and consequently, aircraft revenues. Accordingly, the lighter that inflatable safety devices can be made, the better.

The present assignee has various pending applications related to lightweight air-holding materials sufficient for use in inflatable devices. Although this disclosure may be used in connection with heavy gauge materials as well, it has been found particularly useful in manufacturing inflatable devices made from such lightweight materials.

When welding materials or fabrics to one another, heat from a welding device is generally applied concurrently to the seam tape (or other component) and the fabric panel. The heat can cause slight melting of the fabric panel, and slight melting of the seam tape, such that the melted fabric/seam tape adheres to one another. This is also the process used with other components that may be secured to the fabric. However, when welding a lightweight air-holding material, there is a risk that heat from the welding device may melt completely through the fabric and/or completely through the air-holding coating of the fabric. If this occurs, the integrity of the fabric itself can be at risk.

The present disclosure provides a solution that overcomes some of the deficiencies of the known art and the problems that remain unsolved. Specifically, fabric or seam weakening problems may be encountered due to the high heat required for seam welding, particularly with recent fabrics that have been designed to be more lightweight and thinner than traditional inflatable fabrics. Some of the challenges that exist with joining fabric panels into air- or gas-holding tubular structures can include: melting the coating (without damaging the gas barrier or the fibers), and needing to add more heat to achieve the required seam adhesion. Additionally, using very high heat welding temperatures has the potential to damage the inflatable product material.

Accordingly, the present inventors have found that the seam tape or other component may be pre-heated or otherwise have energy applied thereto in order to change the temperature of the component prior to its application to the fabric panel. In an alternate embodiment, the present inventors have found that more heat energy may be applied to the seam tape or other component than to the fabric panel during welding, which can prevent damage to the air- or gas-holding properties of the fabric. The fabric panel itself is the air- or gas-holding component; the seam tape or other component is structural. Accordingly, the seam tape or other component may be heated as much as need be - and even if it is heated so much that it loses any air- or gas-holding properties that it may have inherently had, it does not affect the resulting air- or gas-holding properties of the inflatable device.

In some examples, a single heating nozzle may be used. In other examples, dual heating nozzles may be used. In further examples, the component is moved through a heated enclosure prior to securement. Each example is described more fully below. The general goal of this disclosure is to apply energy to a component to be secured to a fabric panel before the component reaches a welding intersection, which is the location at which it is welded to the fabric panel. It has been found that pre-heating the component via use of an energy application device, a pre-heating device, or any other device that delivers or applies energy in order to change the temperature of the component can result in a lower welding temperature required at the welding intersection. This can help protect the fabric panel from damage.

Figure 1:
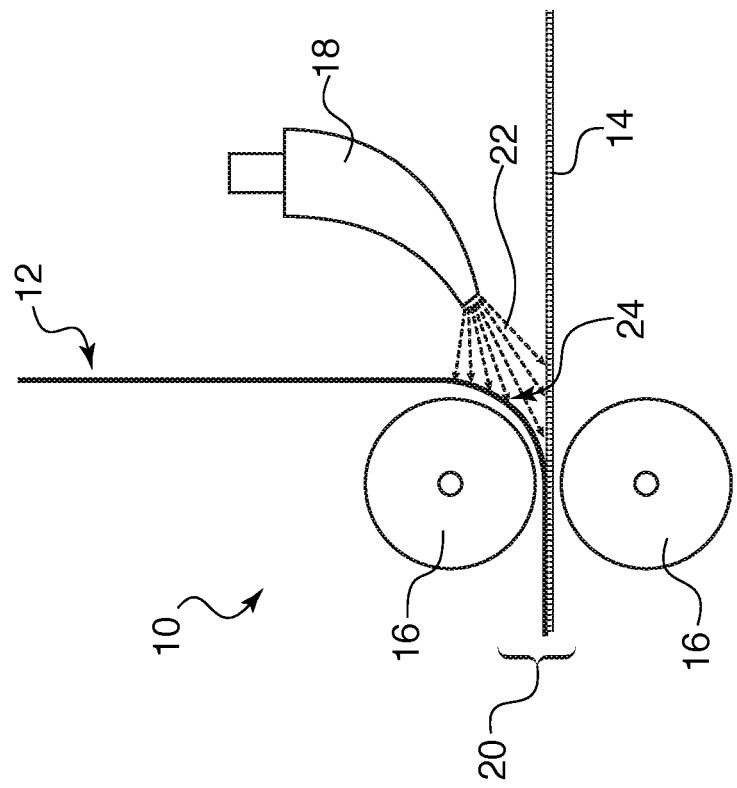
FIG. 1 shows a side plan view of prior art welding of a component to a fabric panel using a primary nozzle.

As background, FIG. 1 illustrates the traditional system 10 used to secure a component 12 to a fabric panel 14. The term "component" is used herein to refer to a seam tape, a seam film, a structural feature, an accessory, any combination thereof, or any other component to be welded to one or more fabric panels. As shown, the fabric panel 14 and the component 12 generally enter the system 10 from different directions. In this example, the fabric panel 14 enters from a horizontal direction, and the component 12 enters from a vertical direction. Rollers 16 may be provided in order to help direct the flow of material. Rollers 16 may also be used to apply pressure to the individual layers 12, 14 as they exit the system 10 as a welded material 20. A primary nozzle 18 directs applied energy 22 (typically in the form of heat energy) at the intersection 24 where the fabric panel 14 and the component 12 meet.

FIG. 2 illustrates an exemplary system 26 in which the primary nozzle 18 is raised above the intersection 24. The primary nozzle 18 may be raised between about ¼ inch to about three inches above the fabric panel 14. In a specific example, the primary nozzle 18 may be raised about ½ inch above the fabric panel 14. In another example, the primary nozzle 18 may be raised about ¼ inch to about one inch above the fabric panel 14. (The primary nozzle 18 may instead be a heated enclosure, a heated wedge, a heated roller, or any other type of energy applying device that can change the temperature of the component, examples of which are described further below.) One advantage of this embodiment is that it can prevent direct application of energy/heat to the fabric panel 14. Instead, the energy is applied to the component at a raised position. The result is that energy can be applied to the component 12 so that it is heated more than (or otherwise has a higher temperature than) the fabric panel 14. Once the component 12 meets the fabric panel 14, there is enough heat to cause the two pieces or layers 12, 14 to flow into each other without damaging the air-or-gas-holding properties of the fabric panel 14.

In an alternate example, dual nozzles or heating devices may be used. For example, a primary nozzle 18 may be kept at the traditional location (at the intersection 24 between the component 12 and the fabric panel 14) and a secondary nozzle 32 (or heated enclosure, heated wedge, heated roller, or other type of energy applying device) may be positioned above the intersection 24 such that additional heat is applied to the component 12 prior to its securement to the fabric panel 14. In this example, the component 12 is preheated, prior to its application to the fabric panel 14.

Figure 3:
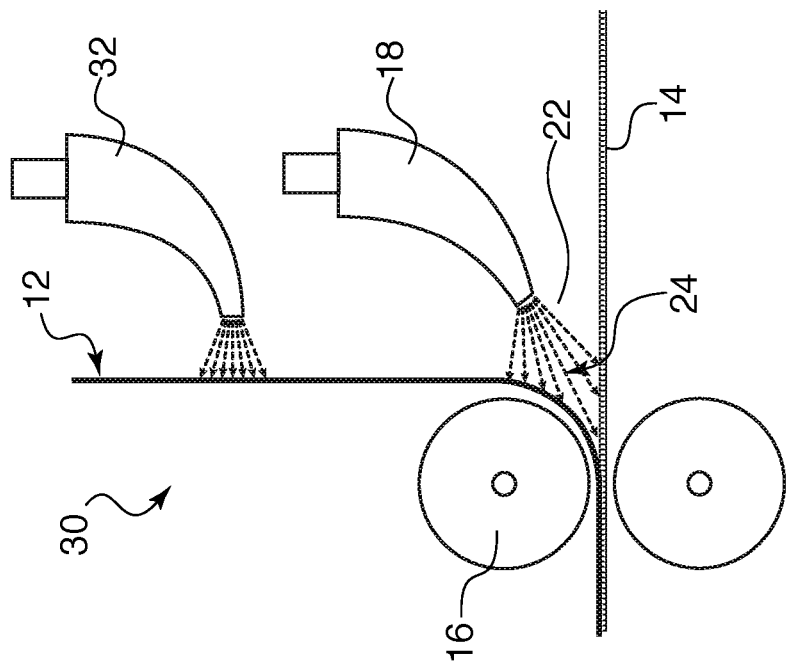
FIG. 3 shows a side plan view of a welding system that uses dual nozzles.

FIG. 3 illustrates an exemplary system 30 that uses a secondary nozzle 32 in addition to a primary nozzle 18. This option is possible for use in connection with all other embodiments described herein. For example, it is possible to provide a raised secondary nozzle and a primary nozzle along with any other energy application devices or systems disclosed. In this example of FIG. 3, the secondary nozzle 32 is raised above the intersection 24 at which the fabric panel 14 and the component 12 meet. In a specific example, the secondary nozzle 32 may be raised between about ½ inch to about eight inches above the fabric panel 14. In other examples, the secondary nozzle 32 may be raised between about two inches to about six inches above the fabric panel 14. In further examples, the secondary nozzle 32 may be raised between about one inch to about four inches above the fabric panel 14. In a specific example, the secondary nozzle 32 may be raised about ½ inch to about 2 inches above the fabric panel 14. The secondary nozzle 32 may blow hot air onto the component. This causes more heat to be applied to the component 12 than to the fabric panel 14. The component 12 may be heated to a temperature that causes it to slightly melt the fabric upon contact, but should generally not melt the fabric completely through.

Instead of or in addition to a raised secondary nozzle 32, there may be provided a raised heated enclosure, heated wedge, heated roller, or other type of energy applying device. All of these options may be referred to as an energy application device, and they are generally used to apply energy to the component 12 in order to raise the temperature of the component 12. The one or more energy application devices may apply energy in the form of heat, such as blowing hot air. They may provide an enclosure filled with hot air. Other options may provide an infrared heater, may provide radio waves (radio frequency welding), may provide microwaves, may provide high-frequency ultrasonic acoustic vibrations (ultrasonic welding), may apply friction energy, or may use any other means to apply energy to the component in order to raise its temperature.

Figure 4A:
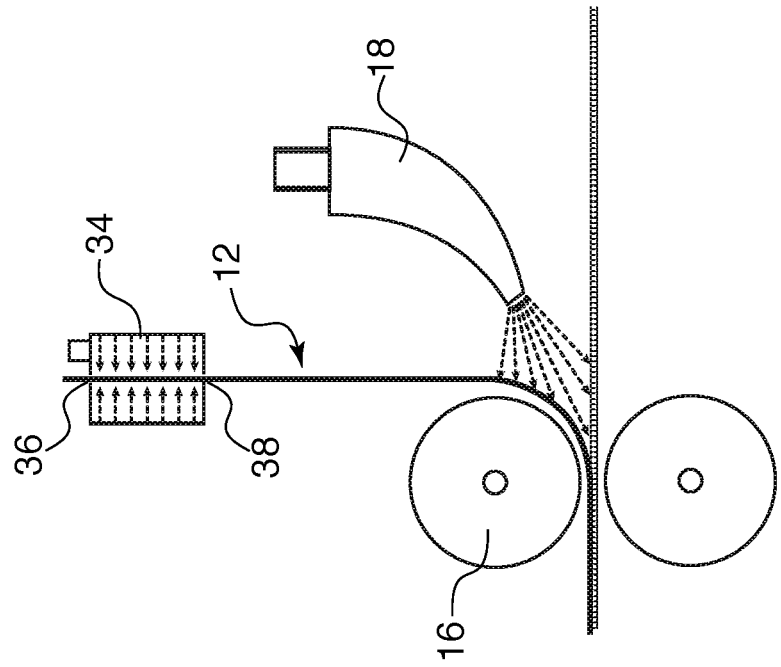
FIG. 4A shows a side plan view of a welding system that uses a primary nozzle and a raised heated enclosure.
Figure 5A:
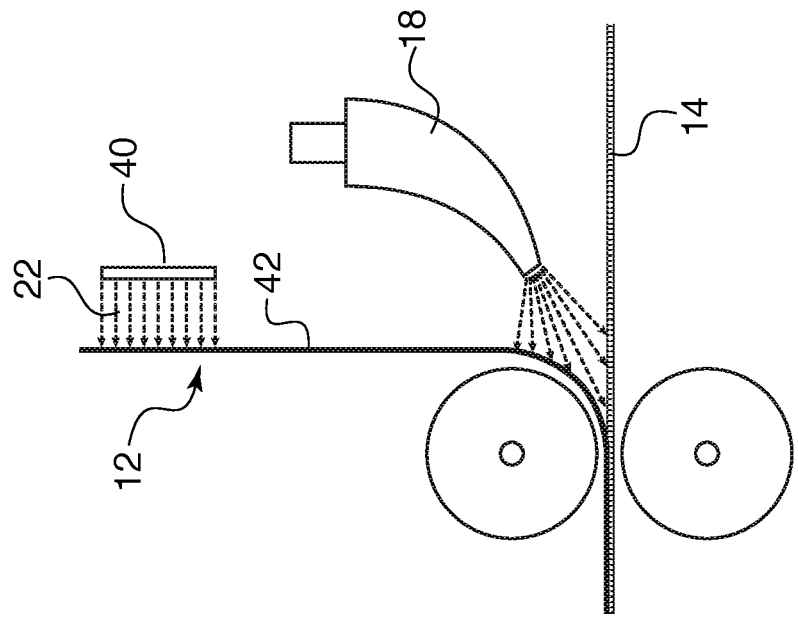
FIG. 5A shows a side plan view of a welding system that uses a primary nozzle and a raised energy application device.
Figure 4B:
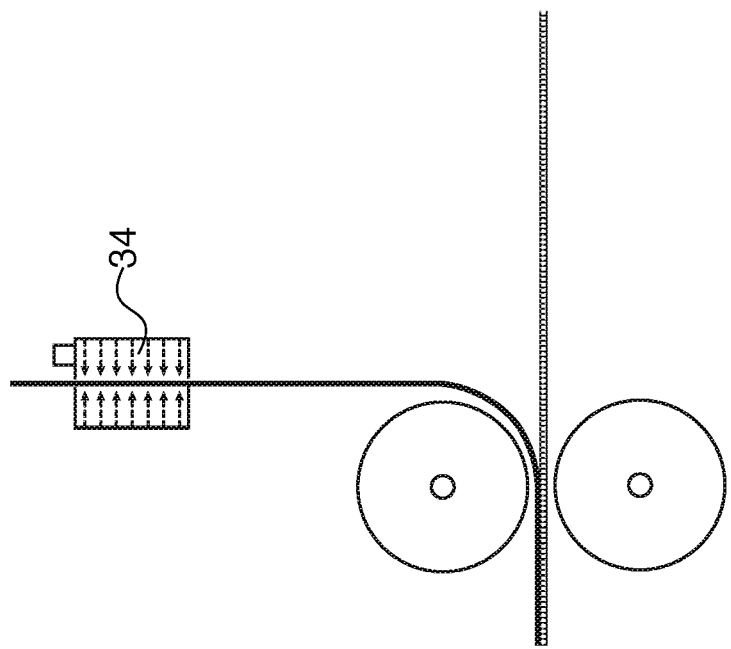
FIG. 4B shows a side plan view of the welding system of FIG. 4A without a primary nozzle.
Figure 5B:
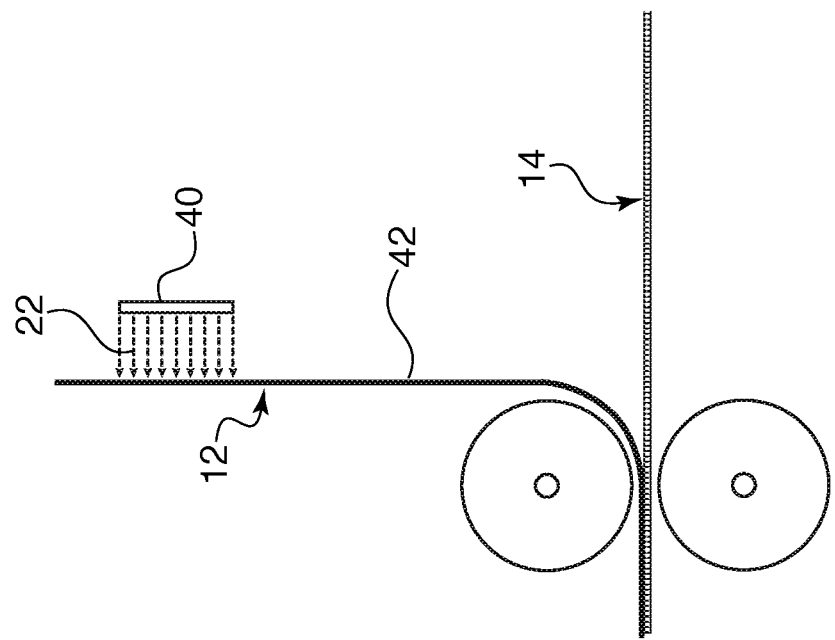
FIG. 5B shows a side plan view of the welding system of FIG. 5A without a primary nozzle.

FIG. 4A illustrates one example of a heated enclosure 34 in use with a primary nozzle 18. As shown, the heated enclosure 34 is designed to apply heat to both sides of a component 12. In one embodiment, the component 12 passes through a heated enclosure 34 that has an inlet 36 to receive the incoming component 12 and an outlet 38 through which the component 12 exits. This ensures that energy is applied to both surfaces of the component 12. FIG. 4B illustrates one example of a heated enclosure 34 used without a primary nozzle. Additionally, although not shown, it is also possible for the heated enclosure 34 to be provided as two separate devices that direct applied energy 22 inwardly, toward both surfaces of the component 12. One device may be on the left of the component 12 and one device may be on the right of the component 12. An optional external housing may enclose both devices. For example, these separate devices may be energy applying devices 40 as shown by FIGS. 5A and 5B. Another option is to combine the system of FIG. 4A with an additional nozzle, such as the one shown in FIG. 2. Additionally or alternatively, any other combinations of the options described herein may be used.

In another example, FIG. 5A illustrates an alternate energy applying device 40 in use with a primary nozzle 18. This alternate energy applying device 40 is positioned such that applied energy 22 is directed toward a fabric-facing surface 42 of the component 12. This ensures that energy/heat is applied to the surface of the component that will be welded to the fabric panel 14. FIG. 5B illustrates one example of an alternate energy applying device 40 used without a primary nozzle.

Figure 6A:
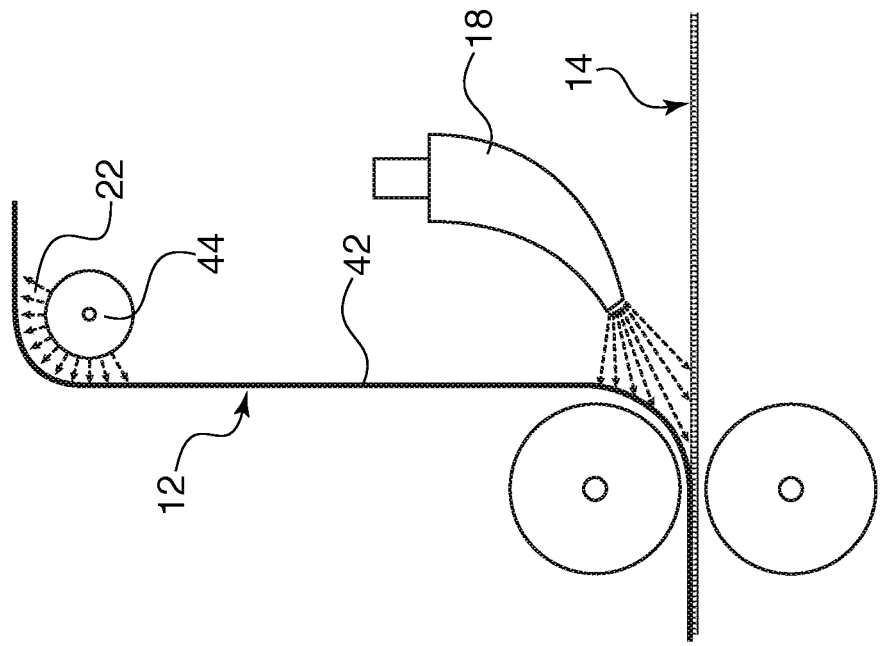
FIG. 6A shows a side plan view of a welding system that uses a primary nozzle and a raised heated roller.
Figure 6C:
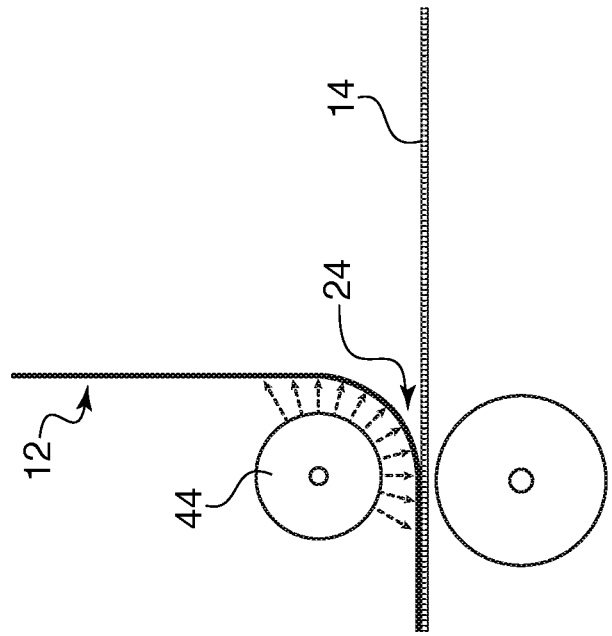
FIG. 6C shows a side plan view of a welding system that uses a lower heated roller.
Figure 6B:
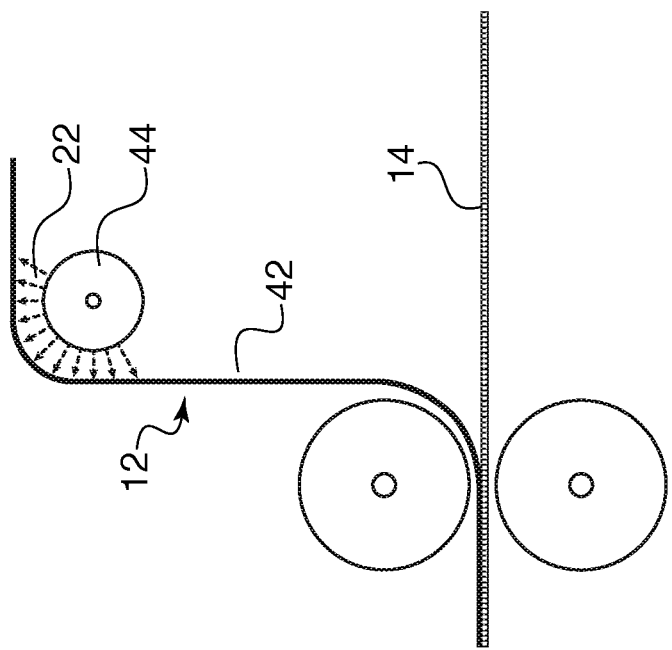
FIG. 6B shows a side plan view of the welding system of FIG. 6A without a primary nozzle.

FIG. 6A illustrates an example in which a heated roller 44 is used to direct applied energy 22 to a component 12. In this figure, the applied energy is directed toward the side of the component that will face the fabric panel 14 when the two layers form a welded material 20. FIG. 6A illustrates use of a heater roller 44 along with a primary nozzle 18. FIG. 6B illustrates a similar heated roller 44, without a primary nozzle. The heater roller 44 is positioned such that it directs applied energy 22 to the fabric-facing side 42 of the component 12, ensuring that energy/heat is applied to the surface of the component 12 that will be welded to the fabric panel 14. FIG. 6C illustrates a heated roller 44 positioned closer to the intersection 24 between the component 12 and the fabric panel 14. This embodiment can apply energy close to the intersection 24, but not directly to the fabric panel 14. Although not shown, it is also possible for the heater roller 44 to be positioned on an opposite side of the component 12.

Figure 7A:
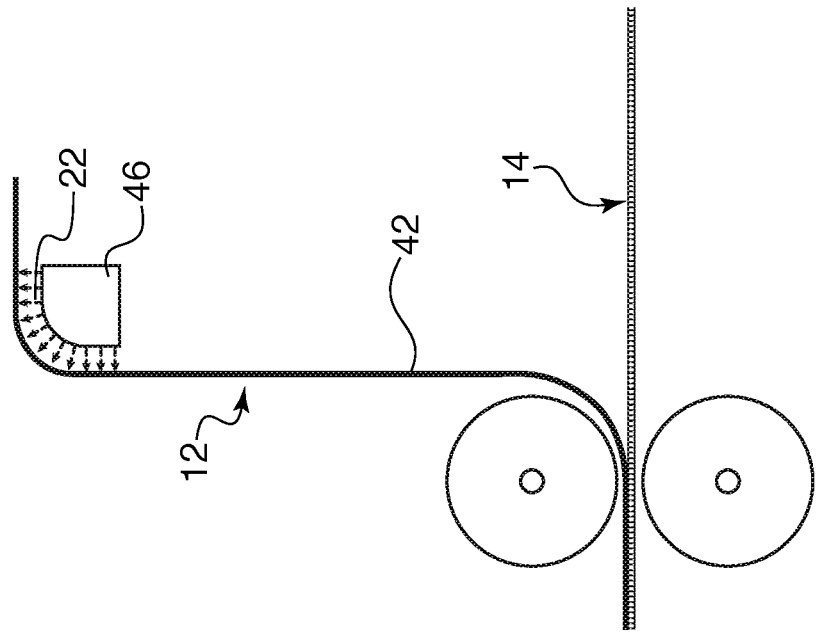
FIG. 7A shows a side plan view of a welding system that uses a primary nozzle and a raised heated wedge.
Figure 7B:
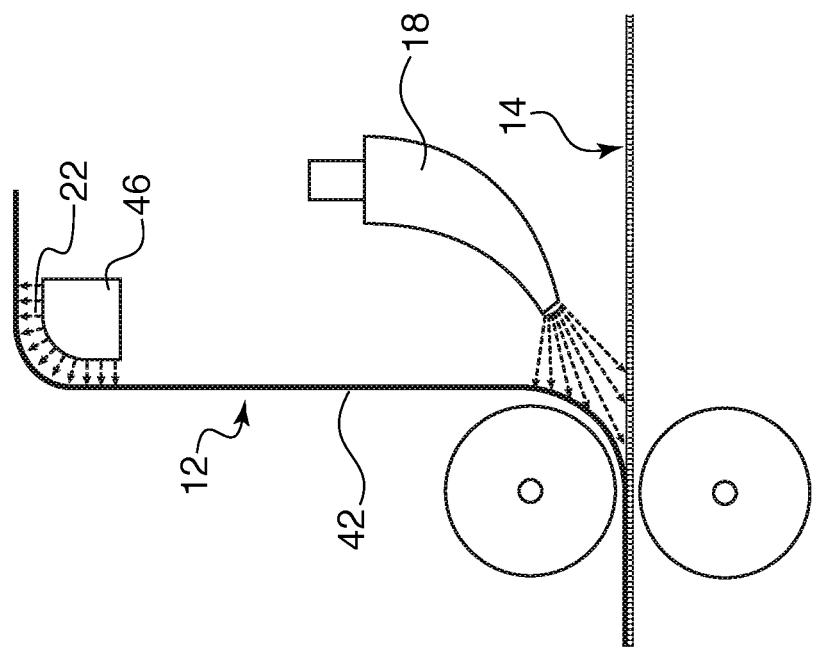
FIG. 7B shows a side plan view of the welding system of FIG. 7A without a primary nozzle.

FIGS. 7A and 7B illustrate an example in which a heated wedge 46 is positioned such that it directs applied energy 22 to the fabric-facing side 42 of the component 12. This ensures that energy/heat is applied to the surface of the component that will be welded to the fabric panel 14. FIG. 7B illustrates a similar heated wedge 46, without a primary nozzle.

It has been found that directing applied energy toward the component 12 before it reaches the intersection 24 can help lower the welding temperature required at the intersection 24. For example, applying energy to the component via a raised secondary nozzle 32, heated enclosure 34, alternate energy application device 40, heated roller 44, heated wedge 46 (collectively referred to as "energy application devices") that directs applied energy toward the component 12 in order to raise its temperature before it reaches the welding intersection 24 allows a higher initial temperature to be directed at the component 12. For example, the primary nozzle 18 typically delivers applied energy at a temperature of about 280° C. This has been found to be the temperature at which welding optimally occurs with traditional fabric and seam tapes. However, use of one or more of the disclosed energy application devices disclosed herein can deliver applied energy at a higher temperature in order to preheat the component 12 prior to its contact with the fabric panel 14. In a specific example, the energy application device can be set to deliver applied energy at a temperature of about 200-350° C. to the component. In a specific example, the applied energy may be delivered at about 300° C. This step of preheating the component or otherwise causing it to have a higher temperature can result in the primary nozzle 18 being set to deliver applied energy at a temperature that is lower than the typical temperatures required. For example, if pre-heating, the primary nozzle 12 may be set to heat at only 200° C., which can help prevent heat damage to the fabric panel 14 that could otherwise occur due to higher welding temperatures. It should be understood that all of the temperature ranges provided herein are based on the type of materials and fabrics used, and are provided for exemplary purposes only.

Although described with respect to securing a fabric panel and a component to one another, it should be understood that this disclosure may also be used to secure any type of structural components and/or accessories to any type of fabric. Non-limiting examples of accessories include an inflation port, a sliding surface, a raft floor, a handle, a girt, a ramp, a canopy, a patch, or any other appropriate structure, or any combination thereof.

The typical temperature to weld a seam tape to a fabric panel body tube fabric (when both are of the same material) using typical welding techniques is between 270-300° C.

Non-limiting examples of fibers or materials that may be used to form the fabric panel 14 or component 12 (such as seam tape material or an accessory) include but are not limited to polyamide (nylon), polyurethane, vinyl, polyethylene, polypropylene, polyethylene terephthalate (PET), polyester, ultra high molecular weight polyethylene, polypropylene, cotton, carbon, glass meta-aramid material (such as like Nomex®), para aramid (such as Kevlar®), liquid crystalline polymers, polystyrene, ethylene vinyl acetate (EVOH), polyvinylidene chloride (PVDC), polycarbonate (PC), polyvinyl chloride (PVC), polylactic acid (PLA), or any combination thereof; any woven, nonwoven, knitted, or film-based substrate, any other appropriate materials, and combinations thereof. The fibers may be any woven, nonwoven, knitted, or film-based substrate, any combinations thereof, or any other appropriate materials that can form a seam tape that does not require an additional air- or gas-holding film to make an air tight joint. It should be understood that the industry is exploring other materials in connection with inflatable structures, and that such materials may be used to form the structures described herein.

The fabric panel 14 and/or the component 12 may have one or more coatings applied thereto. Exemplary coatings include but are not limited to polyamide (nylon), polyurethane, vinyl, polyethylene, polypropylene, polyethylene terephthalate (PET), polystyrene, ethylene vinyl acetate (EVOH), polyvinylidene chloride (PVDC), polycarbonate (PC), polyvinyl chloride (PVC), polylactic acid (PLA), or any combination thereof, or any appropriate materials.

Although the embodiments described herein focus on lifesaving inflatable devices, such as evacuation slides, evacuation slide/rafts, emergency floats, emergency flotation systems, and life preservers, it should be understood that the disclosure is equally applicable to other fabric-like devices, including but not limited to inflatable/non-inflatable decontamination shelters, inflatable/non-inflatable shelters, inflatable/non-inflatable military shelters, ship decoys, inflatable military targets, and space inflatable applications.

It should be understood that different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

That which is claimed is:

1. A method of manufacturing an inflatable device, the method comprising welding a seam tape or seam film to one or more air-holding or gas-holding fabric panels by:
    directing the seam tape or seam film past or through an energy application device prior to contact with the one or more air-holding or gas-holding fabric panels in order to raise a temperature of the seam tape or seam film but not raise the temperature of the one or more air-holding or gas-holding fabric panels, the energy application device configured to provide an application of energy, wherein the application of energy from the energy application device causes at least one surface of the seam tape or seam film to at least partially melt prior to being welded to at least one air-holding or gas-holding fabric panel of the one or more air-holding or gas-holding fabric panels; and
    subsequently contacting the seam tape or seam film with the at least one air-holding or gas-holding fabric panel of the one or more air-holding or gas-holding fabric panels while the at least one surface of the seam tape or seam film is at least partially melted.

2. The method of claim 1, wherein the energy application device comprises a nozzle located before a joining intersection.

3. The method of claim 1, wherein the energy application device comprises a heated enclosure located before a joining intersection.

4. The method of claim 1, wherein the energy application device is located before a joining intersection.

5. The method of claim 1, wherein the energy application device comprises a heated roller or heated wedge located before a joining intersection.

6. The method of claim 1, wherein the energy application device delivers applied energy at a temperature of about 200-350° C.

7. The method of claim 1, wherein directing the seam tape or seam film past the energy application device comprises blowing hot air on the seam tape or seam film, passing the seam tape or seam film through an enclosure, passing the seam tape or seam film past an infrared heater, moving the seam tape or seam film over a heated wedge or a heated roller, applying radio waves, applying high frequency ultrasonic acoustic vibrations, microwaves, friction energy, or any combination thereof.

8. The method of claim 1, wherein manufacturing the inflatable device comprises manufacturing at least one of evacuation slides, evacuation slide/rafts, aviation life rafts, marine life rafts, emergency floats, emergency flotation systems, life preservers/vests, emergency flotation devices, military or nonmilitary inflatable shelters, ship decoys, inflatable military targets, and any other flotation devices, rescue equipment or other safety devices requiring rapid inflation and secure air- or gas-holding functions.

9. An energy application system for directing applied energy to a seam tape or seam film to be applied to an air-holding or gas-holding fabric panel in manufacturing an inflatable device, the energy application system defining:
    a first material path for receiving the seam tape or seam film;
    a second material path for receiving the air-holding or gas-holding fabric panel; and
    a joining intersection where the first material path and the second material path join, the energy application system further comprising:
        a first pre-heating system along the first material path upstream from the joining intersection and configured to pre-heat the seam tape or seam film before the joining intersection, the first pre-heating system comprising a heated enclosure comprising:

an inlet for receiving the seam tape or seam film; and an outlet through which the seam tape or seam film exits, wherein the heated enclosure delivers the applied energy to the seam tape or seam film at a temperature higher than a welding temperature, wherein the applied energy raises the temperature of the seam tape or seam film as to at least partially melt a surface of the seam tape or seam film prior to positioning the seam tape or seam film in contact with the air-holding or gas-holding fabric panel but does not raise the temperature of the air-holding or gas-holding fabric panel prior to welding the seam tape or seam film to the air-holding or gas-holding fabric panel and such that the surface of the seam tape or seam film is at least partially melted when the seam tape or seam film is positioned in contact with the air-holding or gas-holding fabric panel; and a second pre-heating system along the first material path and upstream from the joining intersection, the second pre-heating system configured to pre-heat the seam tape or seam film before the joining intersection, the second pre-heating system comprising a heated roller, a heated wedge, an alternate energy applying device, a primary nozzle, a secondary nozzle, or any combination thereof.

10. The energy application system of claim 9, wherein the heated enclosure delivers the applied energy at a temperature of about 200-350° C.

11. The energy application system of claim 9, further comprising a primary supplemental energy application device configured to apply energy to both the seam film or seam tape and the air-holding or gas-holding fabric panel at the joining intersection, wherein the energy application system is configured to soften or melt the seam film or seam tape prior to heating the seam tape or seam film using the primary energy application device.

* * * * *